Aug. 30, 1932.                P. BANG                 1,875,210
                             AIRPLANE
                        Filed Aug. 6, 1931           2 Sheets-Sheet 1
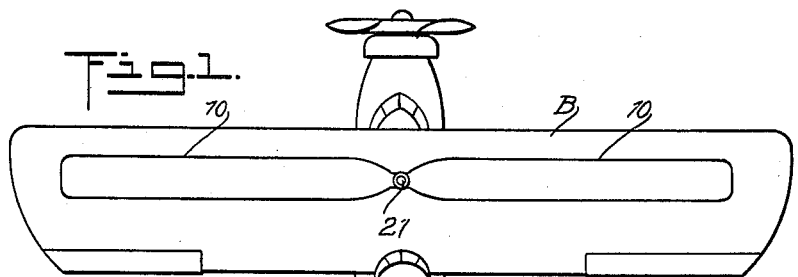
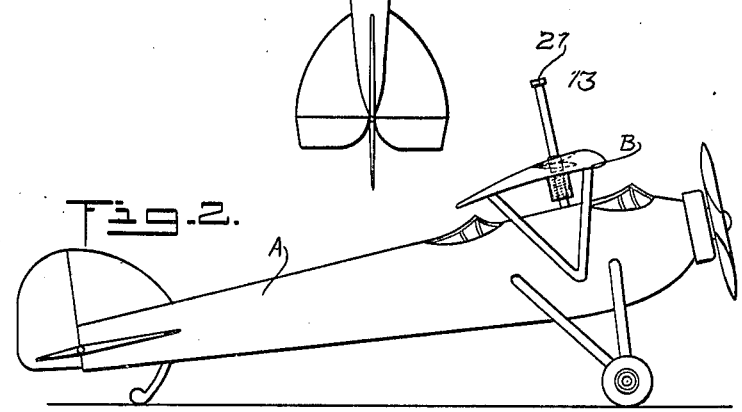
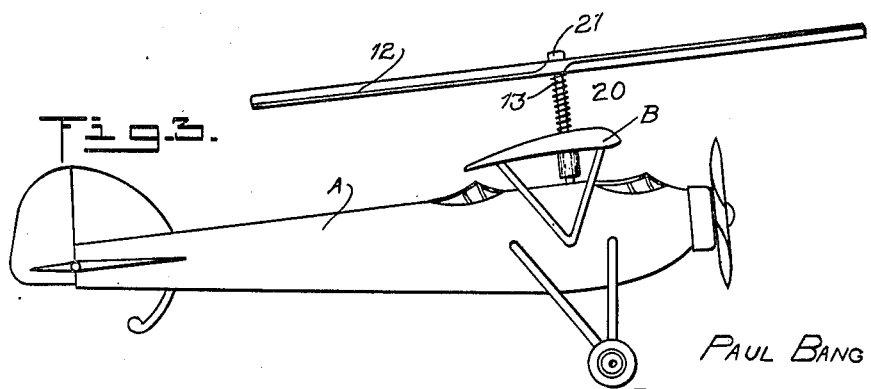
Inventor
PAUL BANG
By Clarence A. O'Brien
                              Attorney

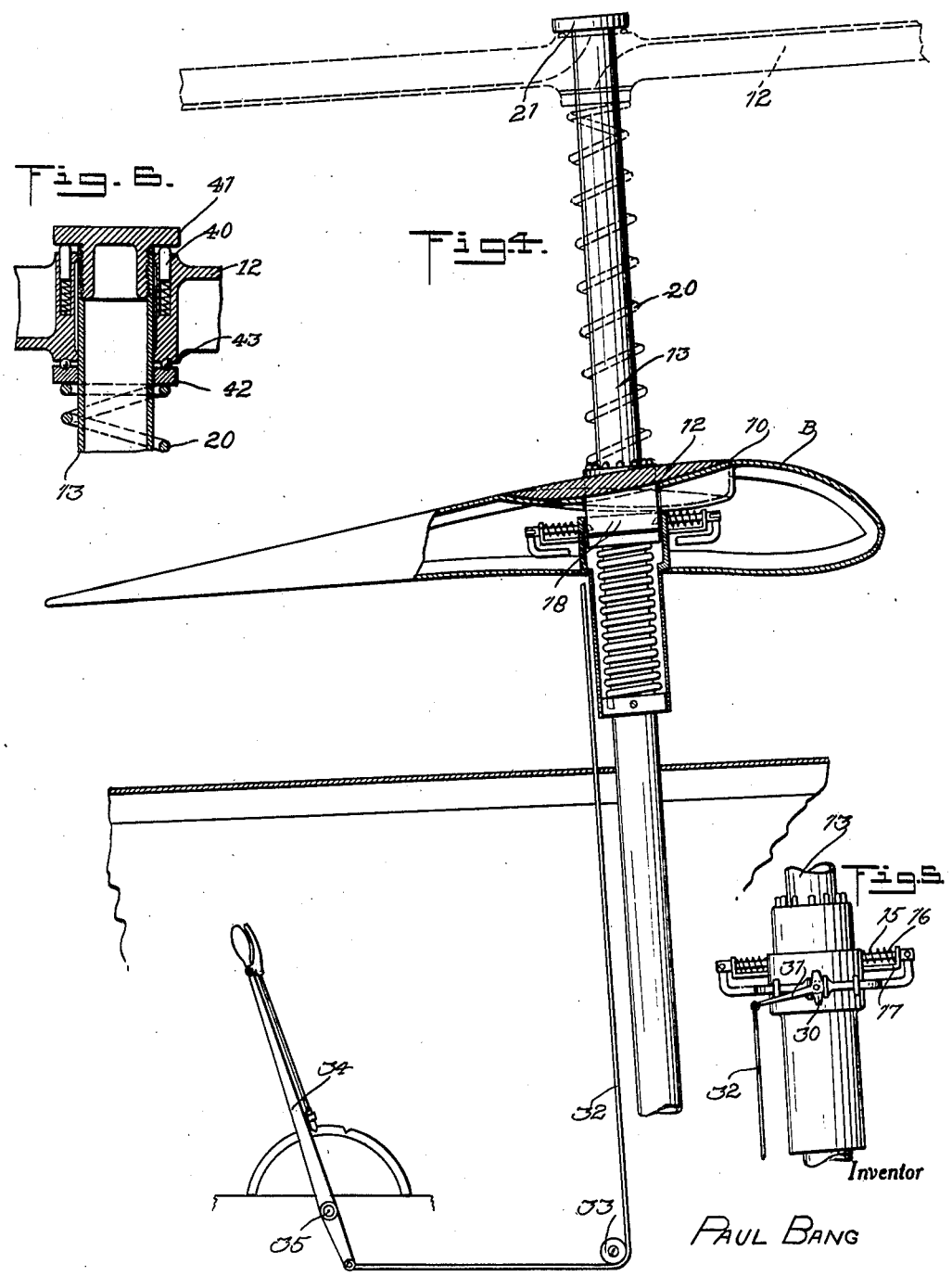

Patented Aug. 30, 1932

1,875,210

UNITED STATES PATENT OFFICE

PAUL BANG, OF YONKERS, NEW YORK

AIRPLANE

Application filed August 6, 1931. Serial No. 555,605.

The present invention relates to new and useful improvements in airplanes, and more particularly it pertains to an auxiliary device especially adapted for use in aiding an airplane of otherwise conventional construction to make safe landings in a comparatively small area.

It is an object of the invention to provide a device which is automatic in operation after the same has been released to operation by the driver of the airplane to which the device is attached.

It is a further object of the invention to provide a device which will serve the purpose of an auxiliary support for an airplane which device is in the form of a rotary member which, however, is not power driven.

A still further object of the invention resides in a novel construction whereby the auxiliary device may be stored or retained in such position as will not interfere with the normal operation of an airplane when the device is not intended for use.

With the above and other objects in view, reference will be had to the accompanying drawings, wherein;

Figure 1 is a top plan view of an airplane constructed in accordance with the present invention, Figure 2 is a view in side elevation thereof showing the parts in their normal position when the attachment of the present invention is not in use, Figure 3 is a similar view showing the attachment of the present invention in its operative position, Figure 4 is an enlarged vertical sectional view illustrating the manner in which the device of the present invention is mounted and operated, Figure 5 is a detail view in elevation illustrating a portion of the operating mechanism of the invention, and;

Figure 6 is a detail longitudinal sectional view.

Referring specifically to the drawings, the reference character A designates the fuselage of an airplane, and B designates the wings.

In accordance with the present invention the wings B are provided with recesses 10 in their upper wall or face, and these recesses 10 are of the shape illustrated in Figure 1.

As best illustrated in Figure 4, these recesses accommodate a supporting member in the form of a blade or the like 12 which is mounted for sliding movement upon a vertically disposed shaft or standard 13. The recesses 10 are of such shape that they will conform to the shape of the member 12 and when the same is nested in the recesses, the upper smooth or stream line face of the wings B will not be interrupted thus permitting of a free flow of air over the top surface of the wings when the member 12 is nested in the recesses thereof.

The member 12 is revolubly mounted upon the shaft or standard 13 and is adapted to exert a plain supporting force when the plane is settling by reason of its rotation upon the shaft or standard 13.

Means is provided to retain the member 12 within the recesses when it is not desired to bring the member 12 into use, and as best illustrated in Figure 5, this means comprises two sliding bolts 15 surrounded by springs 16 and mounted in brackets 17 and these bolts are adapted to engage the depending hubs 18 of the member 12 as best shown in Figure 4 to hold the same in position in the recesses in the wings.

A coil spring 20 surrounds the shaft or standard 13 and tends to move the member 12 to the dotted line position shown in Figure 4 in which position it is held by the spring 20 and the enlarged head portion 21 of the shaft or standard 13. This spring functions immediately the bolts 15 heretofore mentioned are released from their engagement with the hub portion 18 of the member 12 and for this purpose, a cam member such as 30 is provided. This cam member carries an arm 31 and connected to said arm there is a cable, chain or the like 32 which passes around a pulley 33 and is connected to a lever 34 mounted adjacent the pilot's seat. The lever 34 is pivotally mounted as at 35 in such a manner that when it is rocked, the cam member will operate to retract the bolts 15 against the action of their springs 16, and permit the spring 20 to move the member 12 to its operative position in which it is shown in dotted line in Figure 4.

Referring to Figure 6, it will be noted that the hub 18 of the member 12 carries a plurality of spring pressed pins 40 the nose 41 of which is adapted to engage beneath the head or enlarged portion 21 of the shaft or standard 13 and that a thrust bearing in the form of a washer 42 and balls, or rollers or the like 43 are interposed between the upper end of the spring 20 and the lower end of the hub 18 of the member 12.

The device operates in the following manner.

During normal flight of a plane, the device is in the position in which it is shown in Figures 1, 2 and 4 in full lines. When it is desired to make a landing, the lever 34 is operated to release the member 12 to the action of the spring 20. Immediately the spring 20 forces the member 12 to the position in which it is shown in dotted line in Figure 4, and the same begins to rotate under the descent of the plane. This rotation of the member 12 sets up a supporting force which tends to retard the landing action of the plane and thus permits the same to land safely and without shock or damage thereto.

Thus it will be apparent that the present invention provides a new and improved device by means of which the landing of airplanes is greatly facilitated and which device serves to prevent accidents in landing.

While the invention has been shown and described in a preferred form, it is to be understood that it is not to be limited to the specific construction herein shown, and that it may be practiced in other forms without departing from the spirit thereof.

Having thus described the invention, what is claimed as new and what it is desired to secure by Letters-Patent of the United States, is:

In a flying machine, a wing having a recess extending parallel to the leading edge of the wing and terminating at points adjacent the tips of the wing, a supporting propeller nested in said recess, a vertically disposed standard extending thru said wing and said recess, a housing suspended from said wing and receiving a portion of said standard and an expansion spring mounted on said standard between the lower end of said housing and said propeller, and latch means for holding the supporting propeller in retracted position against the expansive force of said spring, said spring being held in line by the shaft standard.

In testimony whereof I affix my signature.

PAUL BANG.